No. 844,697. PATENTED FEB. 19, 1907.
E. SOLOMIAC.
STEAM GENERATOR.
APPLICATION FILED SEPT. 11, 1906.

7 SHEETS—SHEET 2.

No. 844,697. PATENTED FEB. 19, 1907.
E. SOLOMIAC.
STEAM GENERATOR.
APPLICATION FILED SEPT. 11, 1906.

7 SHEETS—SHEET 3.

WITNESSES

INVENTOR
Emile Solomiac
ATTYS

No. 844,697. PATENTED FEB. 19, 1907.
E. SOLOMIAC.
STEAM GENERATOR.
APPLICATION FILED SEPT. 11, 1906.

7 SHEETS—SHEET 4.

WITNESSES
Alvin S. White
W. P. Burke

INVENTOR
Emile Solomiac
BY Richards &co
ATTYS

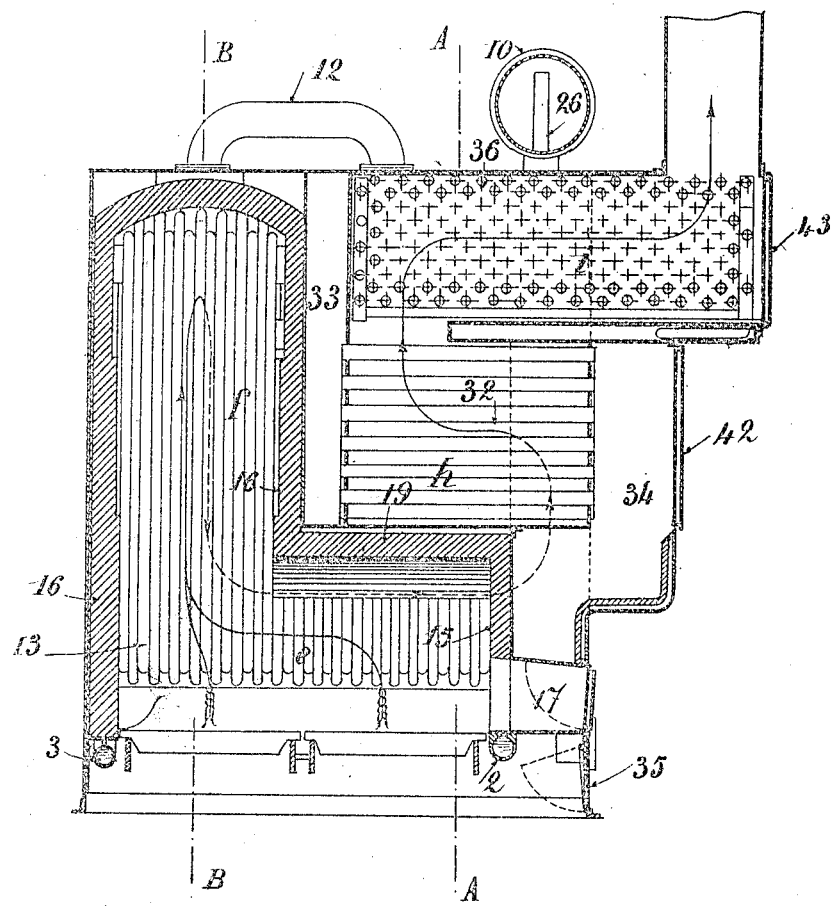

No. 844,697. PATENTED FEB. 19, 1907.
E. SOLOMIAC.
STEAM GENERATOR.
APPLICATION FILED SEPT. 11, 1906.

7 SHEETS—SHEET 7.

WITNESSES
Elvin J. White
W. P. Burke

INVENTOR
Emile Solomiac
BY Richard &Co
ATTYS

UNITED STATES PATENT OFFICE.

EMILE SOLOMIAC, OF PARIS, FRANCE.

STEAM-GENERATOR.

No. 844,697.     Specification of Letters Patent.     Patented Feb. 19, 1907.

Application filed September 11, 1906. Serial No. 334,126.

*To all whom it may concern:*

Be it known that I, EMILE SOLOMIAC, civil engineer, a citizen of France, residing at 39 Rue Claude-Villefaux, Paris, France, have invented new and useful Improvements in Steam-Generators, of which the following is a specification.

This invention relates to an improved steam-generator which partakes of the type of the so-called "small-tube" generators as regards the vertical position and curvilinear shape of the tubes forming the direct-heating surface and of the type of the so-called "large-tube" generators as regards the horizontal position and rectilinear shape of the tubes forming the indirect-heating surface. The advantages of small bulk and easy access, as in large-tube boilers, are thus combined with the advantage that the highest temperatures of combustion can be applied, as in small-tube boilers.

The improved steam-generator is light, smokeless, and capable of economical working with a large output. The circulation is efficient, and saturated or superheated steam can be generated at will without the aid of auxiliary apparatus. The superheating can be regulated as desired, and steam at a temperature of 200° centigrade can be produced, so that the generator is suitable for use with steam-motors of all kinds, and more particularly with steam-turbines.

The invention is illustrated in the annexed drawings, in which—

Figure 1:
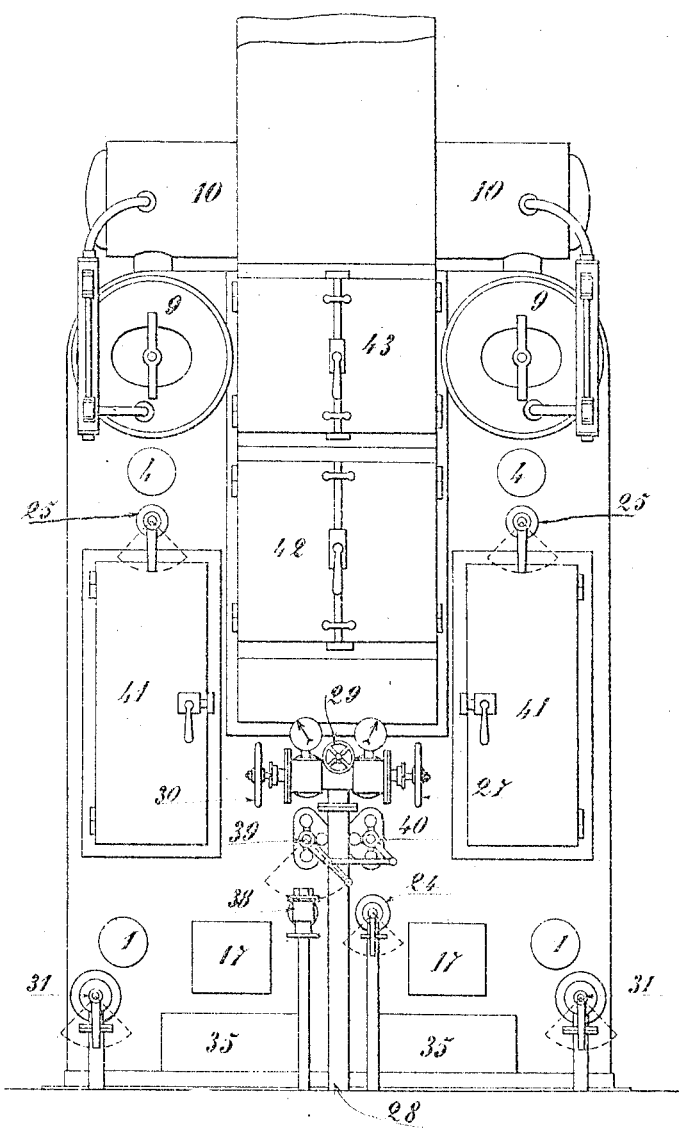
Figure 2:
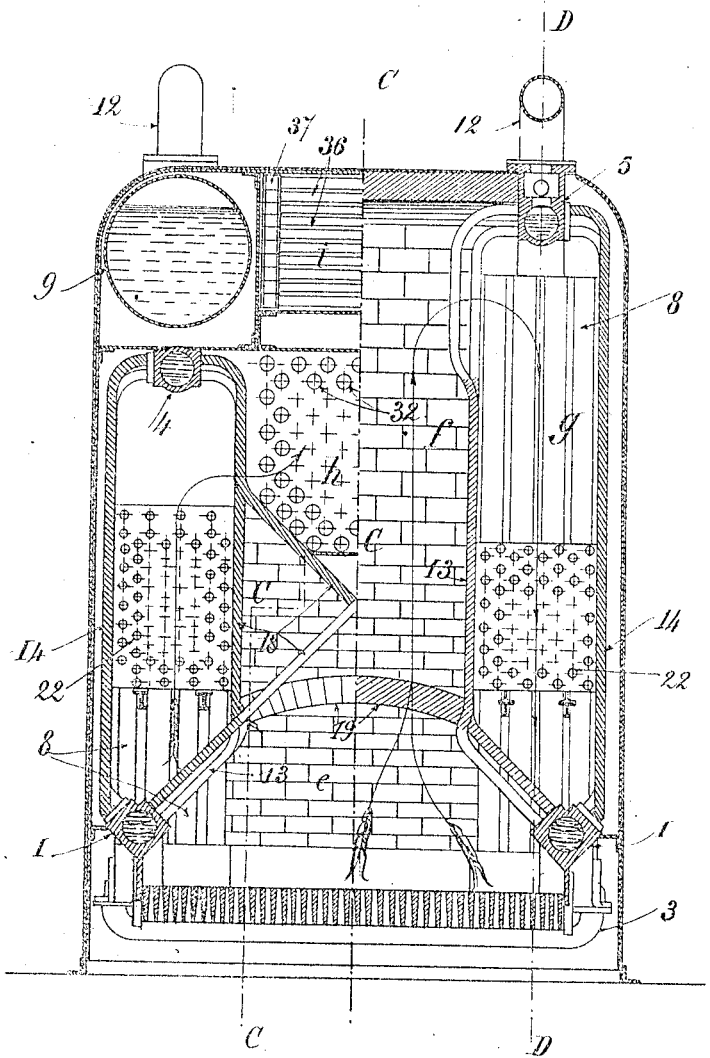
Figure 3:
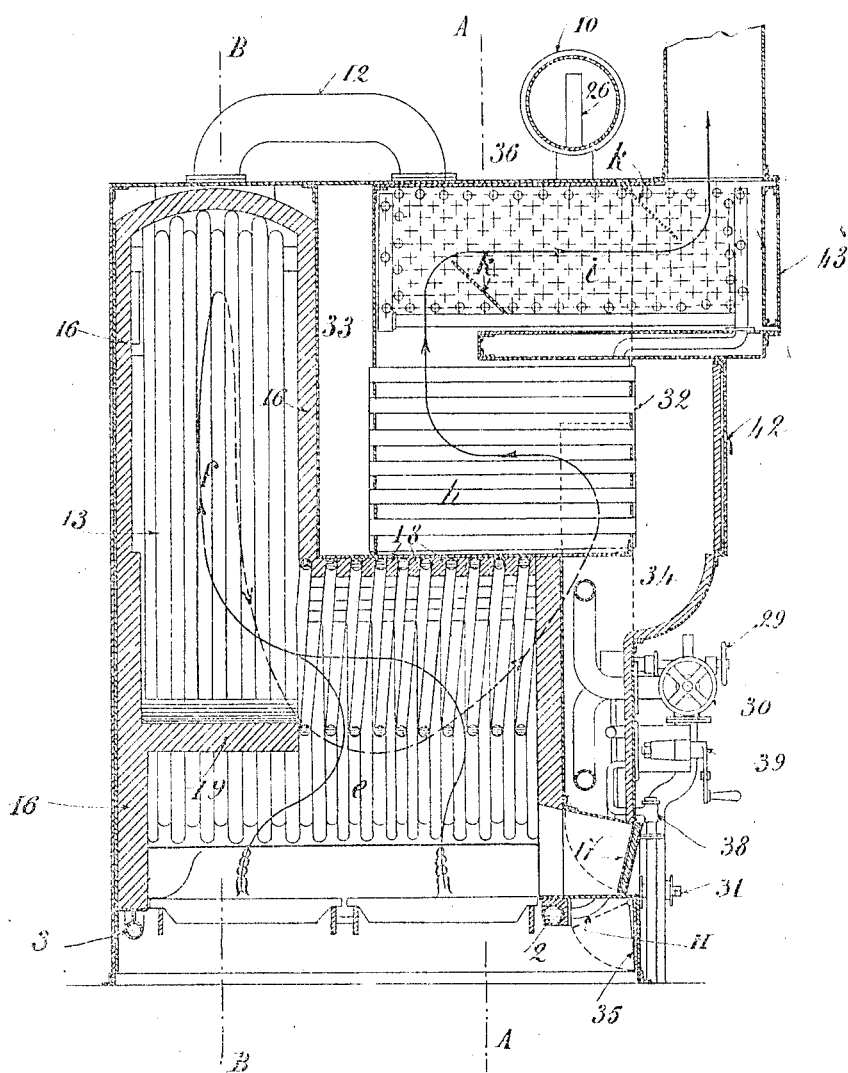
Figure 4:
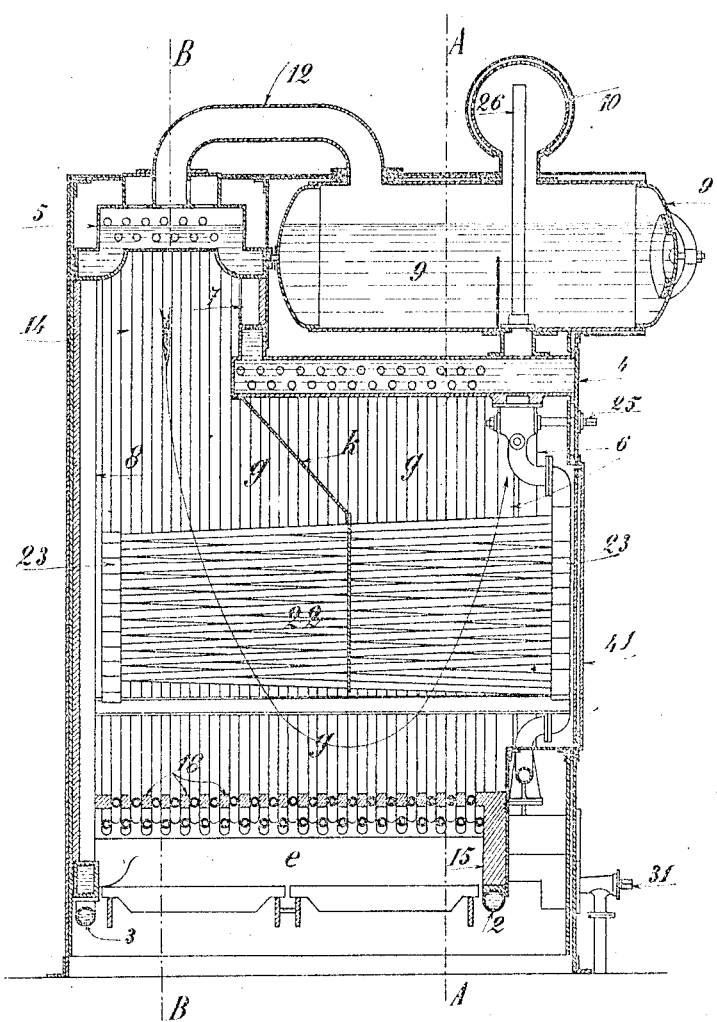
Figure 5:
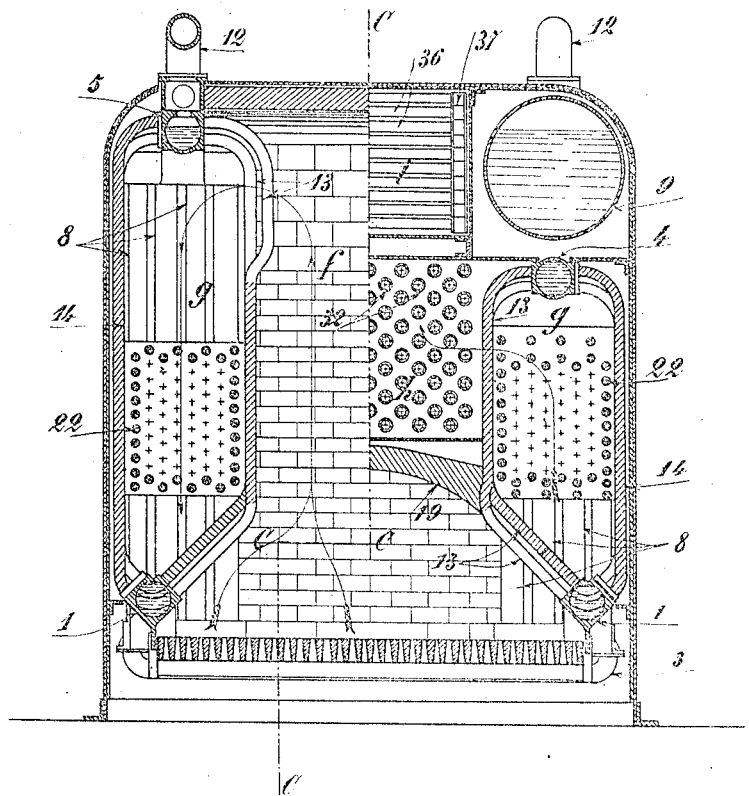
Figure 8:
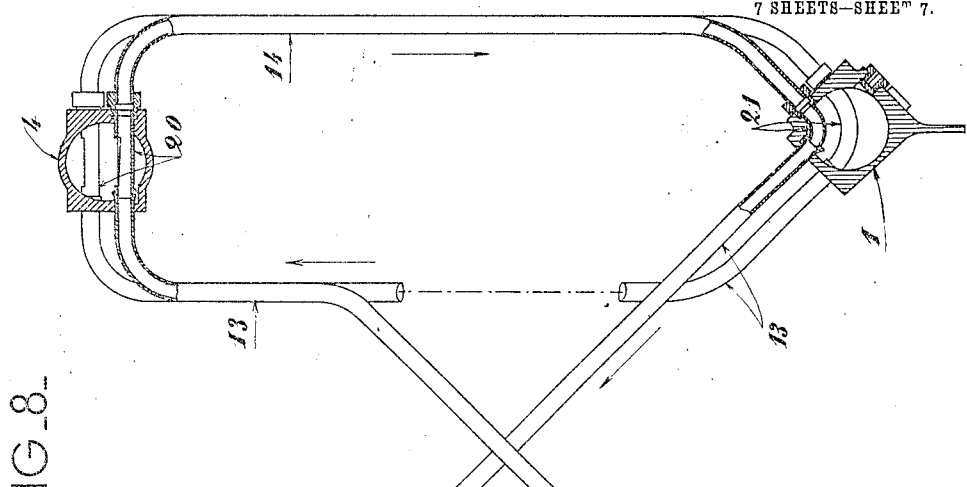
Figure 7:
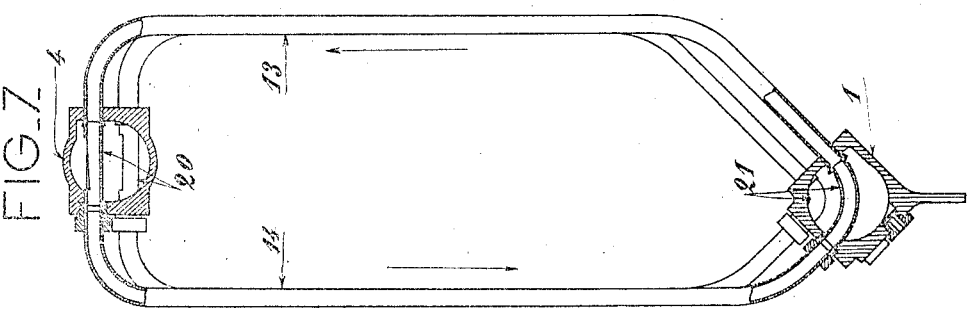

Figures 1 to 4 represent an example of the improved generator. Fig. 1 is a front elevation. Fig. 2 comprises two vertical half-sections on the lines A A and B B of Figs. 3 and 4, respectively; and Figs. 3 and 4 are vertical sections on the lines C C and D D of Fig. 2. Figs. 5 and 6 are analogous to Figs. 2 and 3 and illustrate a modification. Figs. 7 and 8 illustrate, on a larger scale, a detail of the steam-generator.

The path of the flames and heated gases is indicated by arrows in Figs. 2, 3, 4, 5, and 6. Where necessary, the flow of the products of combustion is directed by means of suitably placed baffles k.

The distribution of the heating-surface is based on a new principle. Instead of directly applying the entire heating-surface to the production of steam, as in ordinary steam-generators, only part of the said surface—viz., approximately two-fifths thereof, including the entire direct-heating surface—is used for evaporating water. Another part of the heating-surface is used for superheating steam, another part for heating air for combustion, and another part for heating feed-water. The apparatus thus comprises the following independent elements:—the vaporizer, the superheater, the air-heater, and the feed-water heater, these elements being placed in the order given in the path of the gases of combustion.

The vaporizer comprises lower drums 1, connected to each other by tubes 2 and 3, and upper drums 4 and 5. The drums 1, 4, and 5 communicate with each other by means of vertical pipes 6, 7, and 8 of large diameter, which serve for the return of the water. Above the drums 4 are arranged boxes 9, which communicate with a steam-box 10 and with the vertical tubes 6. The feed-water is supplied through the pipe 11 to the tube 2, and thence passes to the drums 1 and is distributed to the tubes 13. Steam from the upper drums 5 passes through tubes 12 to the boxes 9.

The parts described are rigidly interconnected and constitute a skeleton or frame, which, with the groups of tubes 13 and 14, forms the vaporizer.

The tubes 13 and 14 are vertically inserted between the drums 1, 4, and 5 and form the lateral walls of the furnace e, combustion-chamber f, and flues g and h. For this purpose the said tubes are placed closely together, except at the parts not cross-hatched in Figs. 2 and 5, at which apertures are provided for the passage of flames and gases. The front and rear walls 15 and 16 of the combustion-chamber are of fire-brick, doors 17 being provided in the wall 15. In the construction illustrated in Figs. 1 to 4 the roof of the furnace is formed by intercrossing tubes 13, with blocks 18 filling the spaces between the said tubes, and with an arch 19, of refractory material. In the construction of Figs. 5 and 6 the roof is formed by the arch 19. In both forms of construction the roof of the combustion-chamber is arched and consists of fire-brick.

Another characteristic feature of the invention consists in utilizing the *vis viva* of the moving mass of water at the heating-surface.

In the construction illustrated in Figs. 5 and 6 the tubes 13 and 14 are mounted in pairs in a vertical plane in such a manner as to form substantially O-shaped circuits, Fig. 7, the continuity of which through drums 1, 4, and 5 is secured by means of special ajutages 20 and 21. The purpose of the latter is to insure the passage of water from the ascending tubes 13, directly heated by the furnace, to the descending tubes 41, not so heated, whence the water returns to the tubes 13. The ajutages serve, secondly, for the discharge into the drums 4 and 5 of the steam generated in the ascending tubes 13, (ajutages 20,) and, thirdly, to feed the circuits with replacing water from the drums 1, (ajutages 21.)

In the construction illustrated in Figs. 1 to 4 the tubes 13 and 14 are alternately mounted in pairs to form O-shaped circuits and in groups of four to form circuits substantially of the shape of a reclining figure 8. The ajutages 20 and 21 are in this case also used.

The superheater comprises two symmetrical parts consisting of groups of tubes 22, connected in a serpentine-like manner to boxes 23. The superheater can be cut off from the generator by means of cocks 25.

When the furnace is started, the superheater acts as an auxiliary generator, the tubes 22 being supplied with water by means of the cocks 24 and 25 and the steam passing through the cocks 25 and pipes 26 to the box 10. The movement of the steam is at this stage upward.

For superheating the steam when pressure has been raised the movement is reversed by means of the cocks. The supply of water at 24 is cut off, and steam from the box 10 is caused to pass through the superheater in a downward direction and then to flow to the engine through the valve 27 and pipe 28.

A screw 29 allows of regulating the superheating of the steam by regulating the injection of water from the boxes 9.

30 is a valve through which saturated steam can be supplied to the pipe 28, and superheated and saturated steam can be mixed by suitably opening the cocks 27 and 30. 31 is a relieve-cock.

The air-heater consists of a group of movable tubes 32, of small diameter, arranged between two plates. Air supplied at 33 passes through the said tubes and thence at 34 to the furnace. Air can also be directly supplied below the fire-bars through the doors 35.

The feed-water heater consists of a group of tubes 36, connected to the boxes 37 in a serpentine-like manner. From the valve 38 feed-water flows to the cock 39, from which it ascends, and then flows through the heater from the front to the rear in order to descend to the cock 40 and pass through the pipe 11 to the generator, as above described. The feed-water heater can be cut off from the boiler by means of the cocks 39 and 40. The feed then takes place through the valve 38, cocks 39 and 40, and pipe 11 to the boiler direct.

The superheater is located in flues $g$, the air-heater in the flue $h$, and the feed-water heater in the flue $i$. The direction of flow of the steam, air, and water is opposed to the direction of flow of the heated gases.

The separate elements of the apparatus can, if necessary, be removed through the doors 41, 42, and 43 without interrupting the working of the generator, and if direct one or more of the said elements may be dispensed with.

Having now described my invention, what I claim as new, and desire to secure by Letters Patent, is—

1. A steam-generator comprising a vaporizer consisting of drums 1, 4 and 5 arranged at different levels and connected to boxes 9 and 10, said drums being interconnected at their ends by vertical pipes 6, 7 and 8 of large diameter and along their length by two groups of tubes 13 and 14 which form walls of the furnace, of the combustion-chamber and of the flues, in combination with a superheater comprising two groups of tubes 22 connected to the vaporizer, the superheating of the steam being regulated by means of a screw which regulates the injection of water thereto, in combination with an air-heater comprising a group of tubes 32 through which air passes to the furnace, in combination with a feed-water heater in which feed-water circulates before passing to the drums 1, and in combination with flues inclosing the superheater, air-heater and feed-water heater and formed by the tubular walls of the vaporizer, substantially as described and for the purpose set forth.

2. A steam-generator comprising a vaporizer consisting of drums 1, 4 and 5 arranged at different levels and connected to boxes 9 and 10, said drums being interconnected at their ends by vertical pipes 6, 7 and 8 of large diameter and along their length by two groups of tubes 13 and 14 which form walls of the furnace, of the combustion-chamber and of the flues, said tubes 13 and 14 forming besides continuous vertical circuits which are substantially of O-shaped or of the shape of reclining figures 8, the vaporizer comprising also ajutages 20 and 21 which insure the passage of water from the ascending tubes 13 to the descending tubes 14, and from the latter back to the former, in combination with a superheater comprising two groups of tubes 22 connected to the vaporizer, the superheating of the steam being regulated by means of a screw which regulates the injection of water thereto, in combination with an air-heater comprising a group of tubes 32 through which air passes to the furnace, in combination with a feed-water heater in which feed-water circulates before passing to the drums 1, and in combination with flues inclosing the superheater, air-heater and feed-water heater and formed by the tubular walls of the vaporizer, substantially as described and for the purpose set forth.

In testimony whereof I have signed my name to this specification in the presence of two subscribing witnesses.

EMILE SOLOMIAC.

Witnesses:
  LOUIS MOSES,
  HANSON C. COXE.